ized>

United States Patent
Ahmadi et al.

(10) Patent No.: US 8,427,983 B2
(45) Date of Patent: Apr. 23, 2013

(54) TECHNIQUES FOR PROVIDING UPLINK FEEDBACK FOR DOWNLINK-ONLY RF CARRIERS IN A MULTICARRIER SYSTEM

(75) Inventors: Sassan Ahmadi, Portland, OR (US); Shahrnaz Azizi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 12/902,345

(22) Filed: Oct. 12, 2010

(65) Prior Publication Data

US 2011/0216677 A1 Sep. 8, 2011

Related U.S. Application Data

(60) Provisional application No. 61/311,174, filed on Mar. 5, 2010.

(51) Int. Cl.
| | |
|---|---|
| H04L 5/14 | (2006.01) |
| H04B 1/56 | (2006.01) |
| H04W 4/00 | (2009.01) |
| H04W 72/00 | (2009.01) |
| H04W 74/00 | (2009.01) |

(52) U.S. Cl.
USPC ........... 370/295; 370/294; 370/272; 370/273; 370/274; 370/275; 370/276; 370/313; 370/314; 370/327; 370/328; 370/329; 370/330; 370/338; 370/340; 370/341; 455/450; 455/451; 455/452; 455/453; 455/454; 455/455; 455/464

(58) Field of Classification Search .................. 370/294, 370/295, 272–276, 313–314, 327–330, 338, 370/340–341; 455/450–455, 464
See application file for complete search history.

(56) References Cited

U.S. PATENT DOCUMENTS

| | | | |
|---|---|---|---|
| 2009/0131101 A1 | 5/2009 | Van Rooyen | |
| 2011/0039593 A1* | 2/2011 | Lee et al. | 455/515 |
| 2011/0110337 A1* | 5/2011 | Grant et al. | 370/335 |

FOREIGN PATENT DOCUMENTS

| | | |
|---|---|---|
| JP | 2009-506642 A | 2/2009 |
| JP | 2009-545896 A | 12/2009 |
| WO | 2011/109190 A2 | 9/2011 |
| WO | 2011/109190 A3 | 12/2011 |

OTHER PUBLICATIONS

Lim, Chiwoo et al., "Feedback Mechanism for Asymmetric Carrier Aggregation", IEEE 802.16 Broadband Wireless Access Working Group, Mar. 16, 2010, pp. 1-5.
International Search Report and Written Opinion for PCT Patent Application No. PCT/US2011/025737, mailed on Oct. 26, 2011, 9 pages.
International Preliminary Report on Patentability in PCT Application No. PCT/US2011/025737, mailed Sep. 20, 2012, 5 pages.

\* cited by examiner

*Primary Examiner* — Andrew Lai
*Assistant Examiner* — Albert Shih
(74) *Attorney, Agent, or Firm* — Glen Choi

(57) ABSTRACT

Techniques are described for permitting uplink feedback for downlink transmission over downlink-only RF carriers to occur using uplink control channels belonging to another fully-configured RF carrier herein known as a primary carrier. Uplink feedback channels can be allocated for the downlink-only RF carriers in the uplink control regions of a fully-configured RF carrier immediately following the uplink control channels for the primary carrier are allocated. The uplink feedback channels for downlink-only RF carriers can be allocated based on global or local index number of each downlink-only RF carrier in sequential order based on ascending or descending sorting of the index numbers.

24 Claims, 6 Drawing Sheets

TECHNIQUES FOR PROVIDING UPLINK FEEDBACK FOR DOWNLINK-ONLY RF CARRIERS IN A MULTICARRIER SYSTEM

RELATED ART

This application is related to U.S. patent application Ser. No. 61/311,174, filed Mar. 5, 2010 and claims priority there from.

FIELD

The subject matter disclosed herein relates generally to techniques for feedback from communications made in downlink-only carriers using a wireless network.

RELATED ART

Downlink-only radio frequency (RF) carriers for unicast services can be used to increase the data throughput and capacity of cellular communications systems. Examples of downlink-only RF carriers include unpaired Frequency Division Duplex (FDD) and Time Division Duplex (TDD) with a downlink-only partition. In particular, downlink-only RF carriers in conjunction with multicarrier operation and RF carrier aggregation have been of interest where TDD spectrum can be aggregated with FDD spectrum. For example, IEEE 802.16m and 3GPP LTE-Advanced both support carrier aggregation.

IEEE 802.16m draft 8 (2010) defines uplink feedback channels for a primary RF carrier. The uplink feedback channel can be paired with a downlink channel to provide feedback for communications using the downlink channel. The uplink feedback channel can be used to send hybrid automatic repeat request (HARQ) feedback, MIMO feedback, bandwidth request, and other uplink control channels from a mobile station to a base station. However, for the downlink-only RF carriers, a feedback mechanism is not defined. In some cases, it is desirable to provide a feedback mechanism for downlink-only RF carriers.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
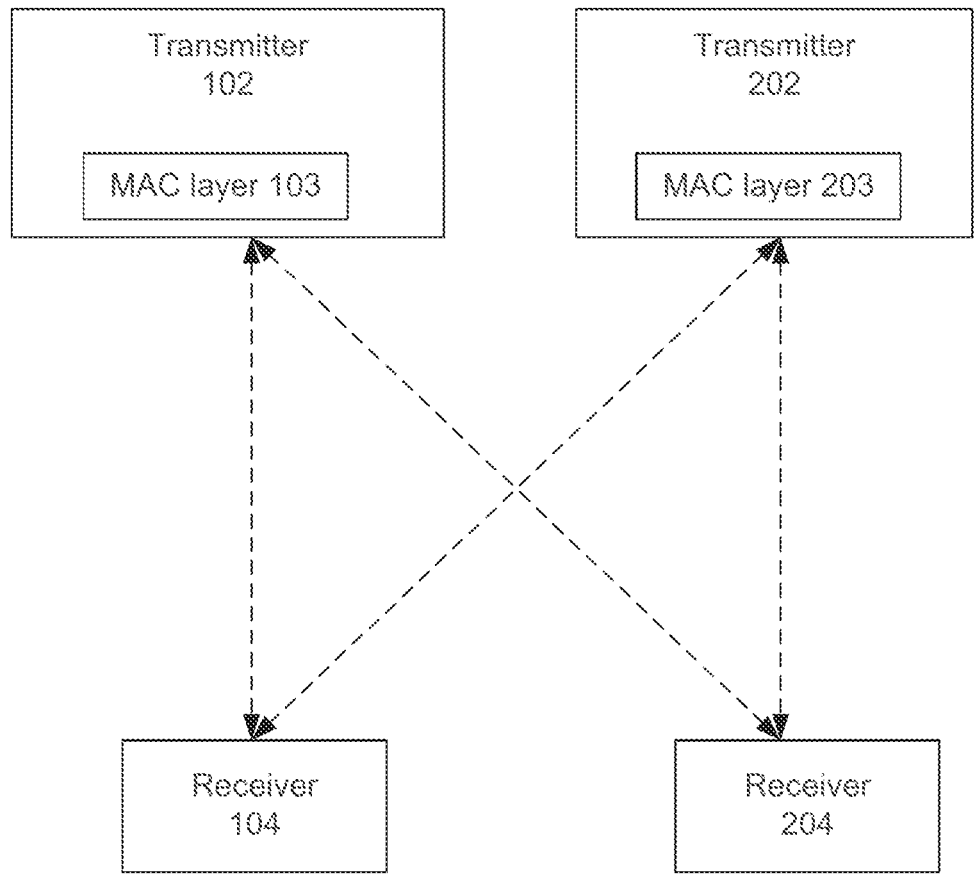
FIG. 1 depicts an example of devices connected using a wireless network.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Some embodiments provide feedback for downlink-only RF carriers in an uplink control region of a fully-configured primary RF carrier. In some cases, feedback channels can be allocated for downlink-only RF carriers immediately following the uplink control channels allocated for the fully-configured primary RF-carrier. Note that many multi-carrier systems have at least one fully-configured primary RF carrier. Feedback channels for downlink-only RF carriers can be allocated based on the physical (or logical) index number of each downlink-only RF carrier in sequential order based on ascending or descending order of the index numbers without negotiation between a mobile station and base station.

FIG. 1 depicts an example of devices connected using a wireless network. The network can be compliant with any variety of IEEE 802.16 or 3GPP LTE as well as variations and revisions thereof. In the downstream or downlink case, the generically-named transmitters 102 and/or 202 above may be interchangeably referred to as a base station (BS) or enhanced Node B (eNB) or access point (AP). In this downlink case, the receivers 104 and/or 204 above may be interchangeably referred to as a mobile station (MS) or subscriber station (SS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS or SS herein may also be seen as a reference to either of UE or STA.

A BS can transmit signals to an MS using a downlink (DL) communications path and receive signals from an MS using an uplink (UL) communications path. Some embodiments provide a manner to allocate UL control channels for DL-only RF carriers (i.e., unpaired RF carriers) on the primary RF carrier UL control region. In some embodiments (e.g., multicast and broadcast services), no additional signaling overhead is used in the UL control region to identify the uplink control regions corresponding to DL-only RF carriers. In some cases, uplink control regions corresponding to DL-only RF carriers are identified without negotiation between a BS and MS and use of bandwidth involved in a negotiation is freed for other uses. At each BS, schedulers in each of media access control (MAC) layers 103 and 203 designate radio resources such as primary and secondary carriers to be used by MSs.

In some embodiments, an UL control region is allocated for primary carrier uplink control signaling and time-frequency resources in the UL control region of the primary RF carrier can be allocated for feedback corresponding to DL-only carriers in order of increasing or decreasing physical (global) or logical (local) index number. For example, for four (4) carriers with two (2) carriers that are DL only: the first part of the UL control region can be allocated for uplink feedback corresponding to the primary carrier, a second part of the UL control region can be allocated for feedback corresponding to the DL-only carrier with the numerically smallest physical index, and a third part of the UL control region can be allocated for uplink feedback corresponding to the DL-only carrier with the next numerically-smallest physical index.

In some embodiments, a BS can inform an MS of logical resource unit locations in an UL control region that the MS can use to transmit feedback. Control channels can be located in logical resource units that were configured prior to the MS's use of these logical resource units for sending uplink feedback corresponding to DL-only carriers. Pre-configuration may lack flexibility but can use less bandwidth because no negotiation may take place. In some cases, a BS can transmit a MAC management or control message in the downlink to configure or allocate uplink control channels to be used for sending uplink feedback for DL-only carriers. RF carriers can be indexed and, in some cases, the index of the DL-only RF carriers may be included in the uplink signaling to identify the RF carrier's control channel. However, in some cases, the index number of a DL-only RF carrier may be implied by a location of its UL feedback. By comparison, use of pre-allocated, fixed frequency partitions for feedback can use less signaling overhead than the case where uplink feedback allocations are dynamically signaled to each MS, potentially resulting in less feedback delay and higher system throughput.

Figure 2:
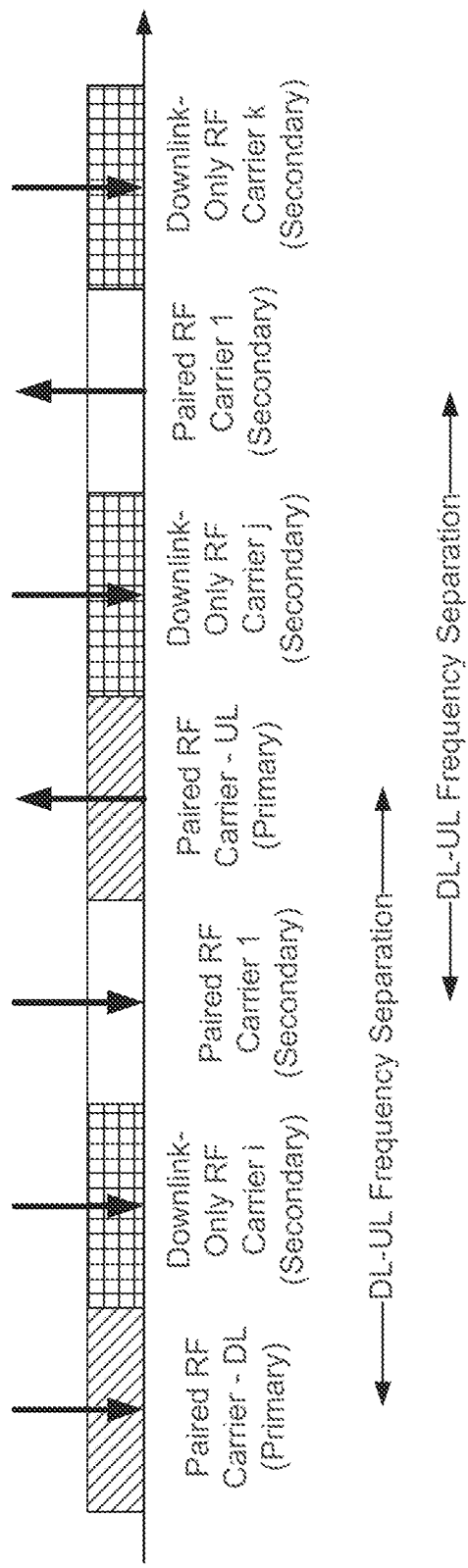
FIG. 2 depicts an example of frequency spectrum and carrier aggregation.

FIG. 2 depicts an example of frequency spectrum and carrier aggregation. As shown, a primary FDD carrier includes a pair of DL and UL carriers and a secondary FDD carrier includes a pair of DL and UL carriers. The primary RF carrier can be a carrier that is used by the BS and the MS to exchange traffic and full PHY/MAC control information. The primary carrier can deliver control information for proper MS operation, such as during network entry. Each MS may acquire only one primary carrier in a cell. The primary carrier can be an FDD (downlink and uplink transmissions conducted on two RF carriers separated in frequency) or a TDD carrier. For example, IEEE 802.16m draft 8 (2010) describes the use of a primary carrier to transmit MAC signaling and commands such as those related to handover, sleep, idle, security update, and so forth.

The secondary RF carrier can be an additional carrier which the BS may use for traffic allocations for mobile stations capable of multicarrier operation. The secondary carrier may also include dedicated control signaling to support multicarrier operation. For example, IEEE 802.16m draft 8 (2010) describes the use of secondary carriers for resource allocation.

Downlink-only RF carriers i, j, and k have no paired UL carrier. Variables i, j, and k denote the physical or logical indices of the downlink-only RF carriers where i<j<k. In some embodiments, because RF carriers i, j, and k are downlink-only secondary RF carriers used for unicast data transmission. In various embodiments, corresponding uplink control channels of downlink-only secondary RF carriers may be accommodated on the primary RF carrier. Note that if a downlink-only RF carrier is used for broadcast and multicast service, an uplink control channel may not be allocated. Although some broadcast and multicast services may be provisioned on a downlink-only RF carrier where uplink control channels (HARQ ACK/NACK and/or fast feedback channels) might be used. In that case, some embodiments can provide an efficient method for allocation of the uplink feedback channels using techniques described herein.

Figure 3:
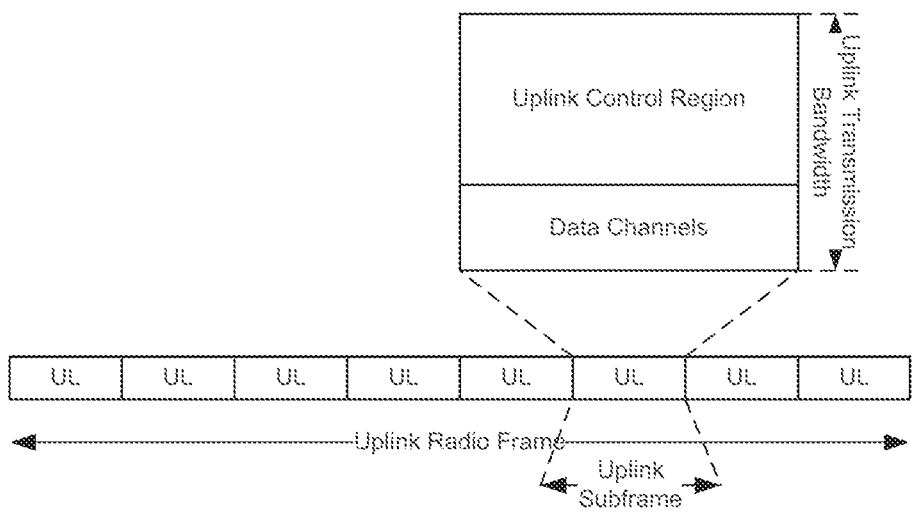
FIG. 3 depicts an example of a Frequency Division Duplex (FDD) frame structure.

FIG. 3 depicts an example of an FDD frame structure. Each UL subframe includes time-frequency resources that can be used for uplink control region and data channels. A radio frame can be divided into a number of subframes for downlink/uplink transmissions. The transmission bandwidth over a subframe can divided into a number of frequency partitions where the subcarriers within a frequency partition are grouped and permuted over a frequency partition to achieve frequency diversity over the communication channel.

Figure 4:
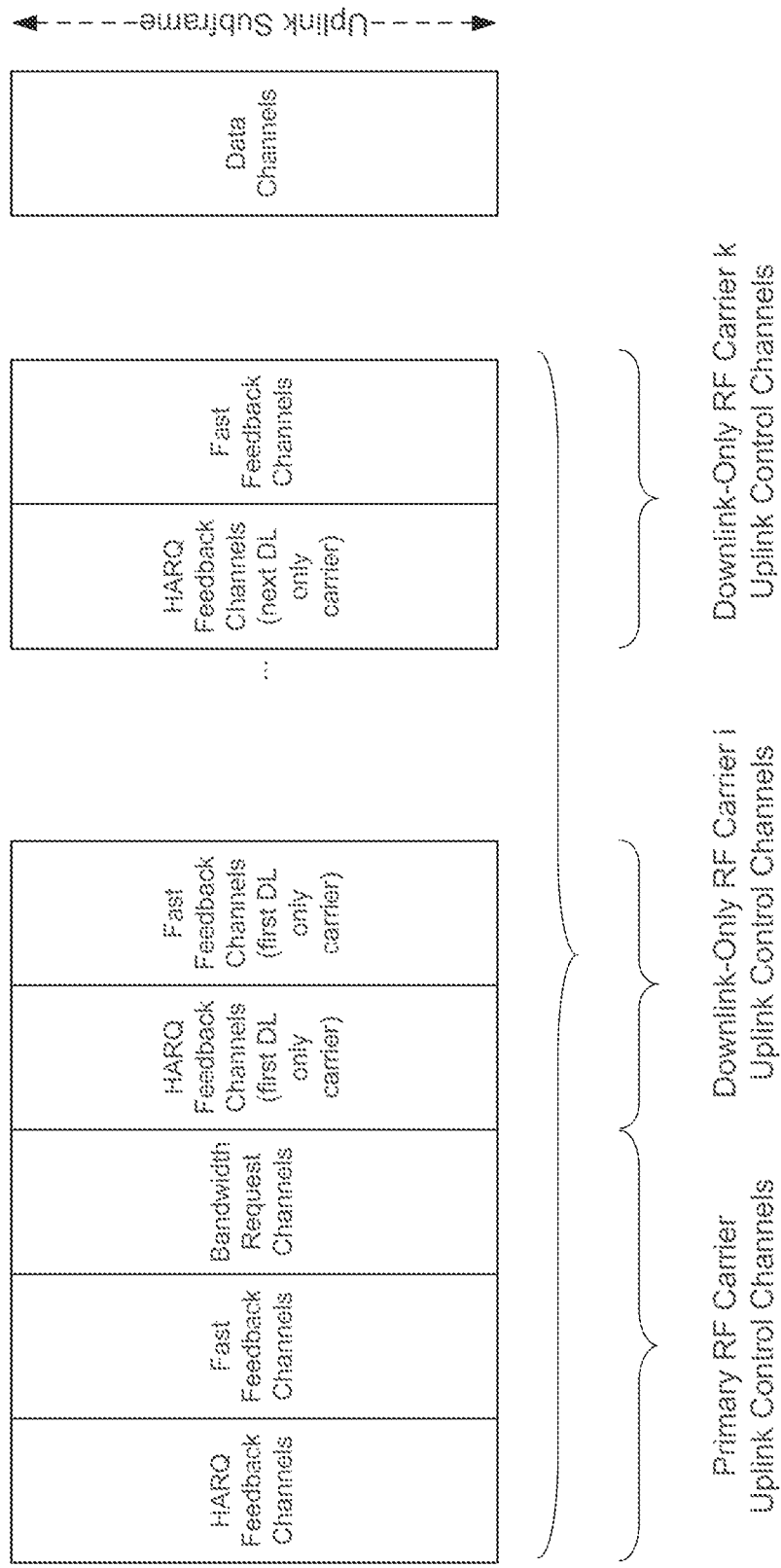
FIG. 4 depicts an example manner to allocate logical resource units in a frequency partition and a manner to allocate uplink (UL) control channels in time and frequency in an uplink control region of the primary RF carrier for downlink-only carriers.

FIG. 4 depicts an example manner to allocate logical resource units in a frequency partition and a manner to map uplink (UL) control channels to time and frequency logical resource units in an uplink control region for downlink-only carriers. Allocation of logical resource units for UL control for a primary RF carrier is described, for example, in section 16.3.7.3.3 of IEEE 802.16m draft 8 (2010) in FIGS. 543 and 544 and accompanying text.

Uplink control channels can include Hybrid Automatic Repeat Request (HARQ) feedback (e.g., Acknowledgement (ACK) and Negative Acknowledgement (NACK) for DL transmissions) as well as Primary and Secondary Fast Feedback Channels (e.g., channel quality indicator (CQI), MIMO feedback, measurements and reporting), and Bandwidth Request Channels. Some embodiments expand the primary RF carrier uplink control-region to further include the uplink control regions of the downlink-only RF carriers in the order of their RF carrier physical or logical indices starting from the smallest index and increasing or starting with the largest index and decreasing. In some cases, downlink-only carriers used for unicast service may use feedback in an UL control region, whereas downlink-only carriers used for broadcast or multicast service may not use feedback in an UL control region.

A base station can allocate and schedule the uplink control channels corresponding to the downlink-only RF carriers in the expanded uplink control region of the primary RF carrier. The information on RF carrier configuration, i.e., whether an RF carrier has been fully or partially configured, whether an RF carrier is primary or secondary, and whether an RF carrier is paired or unpaired, can be transmitted through a downlink broadcast channel and be known by the mobile stations in advance of uplink transmissions.

A pre-provisioned agreement between the BS and MS can take place so that if an MS detects that a carrier is DL-only and knows the physical or logical index of the RF carrier, then the MS knows where the UL control region for each DL transmission is located. For each fully or partially configured RF carrier, there is system configuration information (i.e., a broadcast channel) that provides configuration of the RF carrier. In particular, the information indicates carrier configurations and whether a carrier is downlink only, FDD, TDD, and so forth. A BS can assign a physical index to an RF carrier during system configuration, which can include a broadcast channel that is transmitted periodically to notify an MS during network entry how the system is configured.

The uplink control channels can be frequency-division multiplexed with data channels over an uplink subframe and the size of the uplink control channels can be measured in the number of distributed logical resource units. The logical resource units can be made known to the mobile stations through the broadcast channel.

As an example, assume that a BS allocates distributed logical resource units with indices $n_1$, $n_2$, $n_3$, $n_4$, $n_5$, and $n_6$ to an MS with one primary RF carrier and two downlink-only RF carriers i and j where i<j. In this case, if the MS has three uplink control information (e.g., HARQ, fast feedback channels, and bandwidth request) related to the primary RF carrier and two uplink control information (e.g., HARQ and fast feedback channels) related to RF carrier i and one uplink control information (e.g., fast feedback channel) corresponding to RF carrier j, the MS can use the distributed logical resource units $n_1$, $n_2$, $n_3$ to send the uplink feedback for the primary RF carrier, distributed logical resource units $n_4$ and $n_5$ for downlink-only RF carrier i, and distributed logical resource unit $n_6$ for the downlink-only RF carrier j. While the partitioning of the uplink control regions is transparent to the mobile station, allocations by the base station are based on the RF carrier configuration associated with each MS. In this example, distributed logical resource units $n_1$, $n_2$, $n_3$ are in the primary carrier uplink control region, distributed logical resource units $n_4$, $n_5$ are in the uplink control region corresponding to RF carrier i and distributed logical resource unit $n_6$ is located in the uplink control region corresponding to downlink-only RF carrier j.

Figure 5:
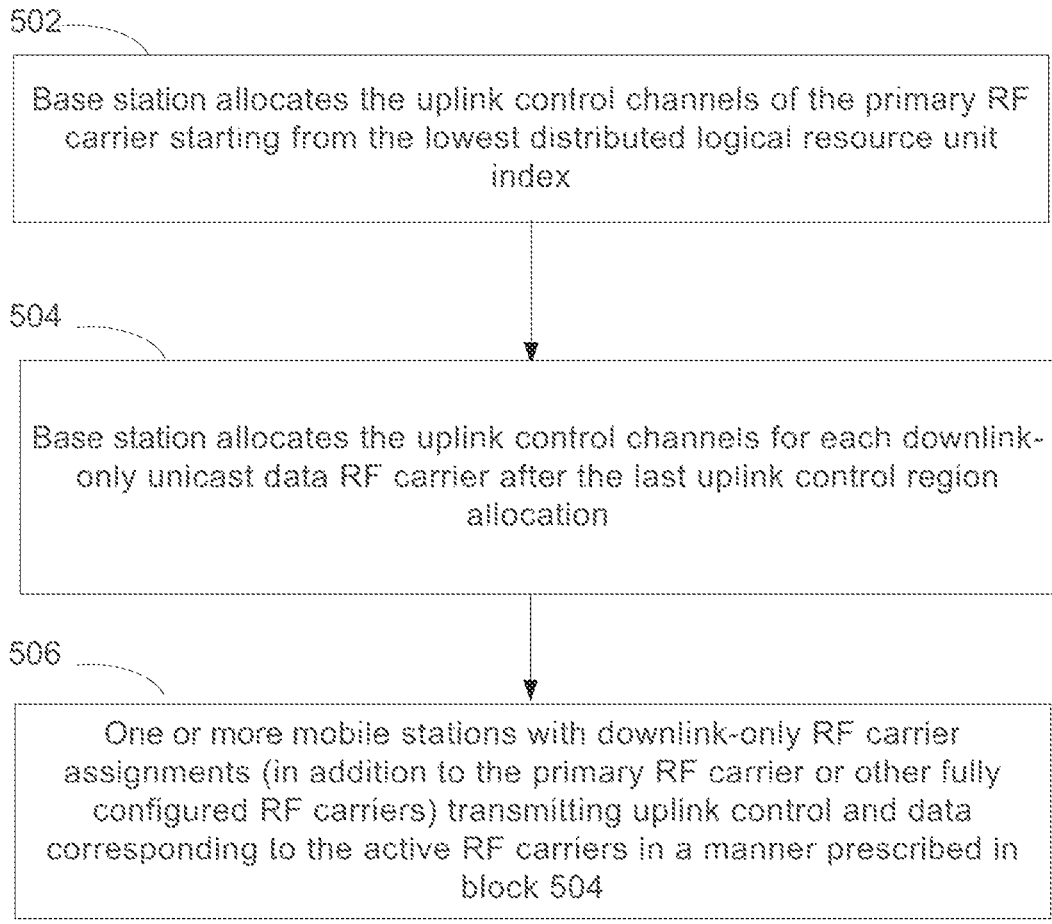
FIG. 5 depicts an example of a process that can be used to provide feedback for downlink-only RF carriers on the uplink of the primary RF carrier.

FIG. 5 depicts an example of a process that can be used to provide feedback for downlink-only carriers.

Block 502 includes a base station allocating the uplink control channels of the primary RF carrier starting from the lowest distributed logical resource unit index.

Block 504 includes the base station allocating the uplink control channels for each downlink-only unicast data RF carrier after the last uplink control region allocation of the fully-configured primary carriers. In some cases, the operation takes place starting on the DL-only carrier with the lowest index and increases incrementally to allocate uplink control channels for all downlink-only (unpaired) unicast data RF carriers. In some cases, the operation takes place starting on the DL-only carrier with the highest index and lowers incrementally to allocate uplink control channels for all downlink-only (unpaired) unicast data RF carriers. The increment can be a value of one or other values.

Block 506 includes one or more mobile stations with downlink-only RF carrier assignments (in addition to the primary RF carrier or other fully configured RF carriers) transmitting the uplink control and data corresponding to the active RF carriers in a manner prescribed in block 504. In some cases, the RF carrier index is not transmitted over the air-interface because the order of the uplink control information allocation can be implicitly understood by the BS and the MS, for example, by the relative position of the RF carrier frequencies in the frequency domain. The uplink control information corresponding to the primary RF carrier can occupy the distributed logical resource units with lower numerical index. The uplink control information corresponding to the downlink-only secondary RF carriers can occupy the remaining distributed logical resource units starting with the lowest carrier index.

Figure 6:
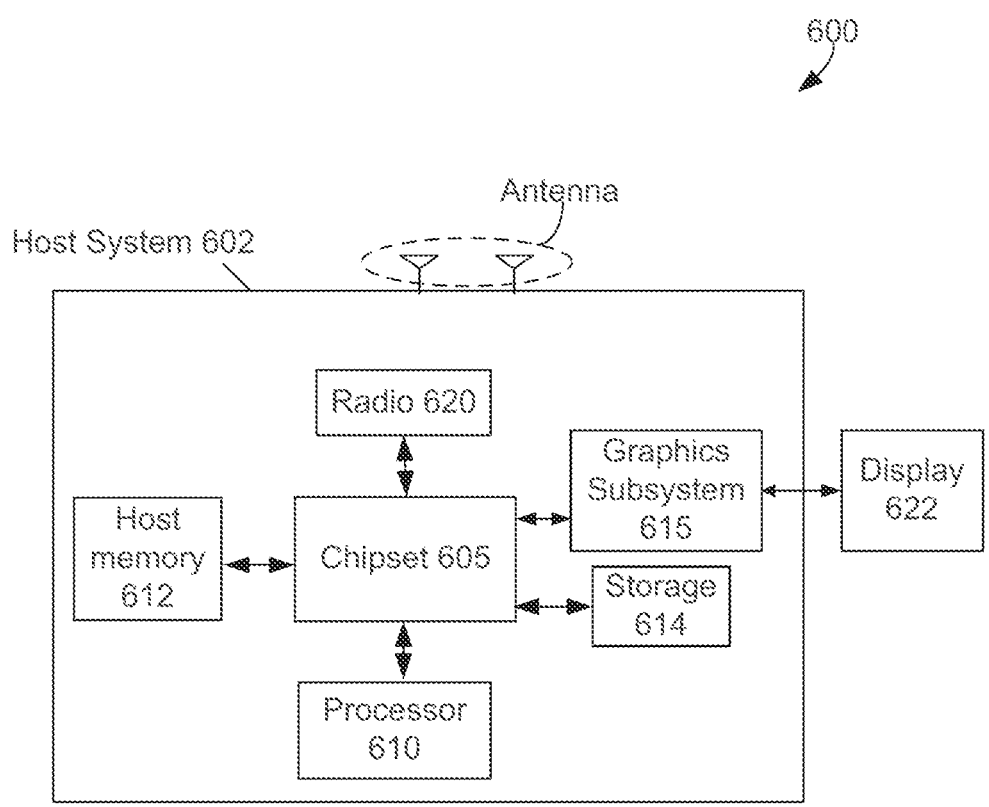
FIG. 6 provides an example of a system in accordance with an embodiment.

FIG. 6 provides an example of a system in accordance with an embodiment. Computer system 600 may include host system 602 and display 622. Computer system 600 can be implemented in a handheld personal computer, mobile telephone, set top box, or any computing device. Any type of user interface is available such as a keypad, mouse, and/or touch screen. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit. In various embodiments, processor 610 can be configured with instructions to perform techniques described herein.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16. For example, radio 620 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method, performed at a base station, the method comprising:
   requesting to schedule and allocate uplink control channels for at least one primary uplink control channel;
   requesting to schedule and allocate a first uplink control channel for a downlink-only carrier; and
   requesting to schedule and allocate a second uplink control channel for a second downlink-only carrier, wherein the requesting to schedule and allocate a first uplink control channel for a downlink-only carrier comprises:
      requesting to schedule and allocate a first uplink control channel for a downlink-only carrier in one or more logical resource units immediately after one or more logical resource units allocated for the primary uplink control channels and a logical resource unit for the first uplink control channel having a physical or logical index number.

2. The method of claim 1, wherein the first uplink control channel for a downlink-only carrier has a lowest physical or logical index number associated with one or more logical resource units immediately after the one or more logical resource units allocated for the primary uplink control channel.

3. The method of claim 2, wherein the second downlink only carrier has a next lowest physical or logical index number associated with one or more logical resource units immediately after the one or more logical resource units allocated for the first uplink control channel.

4. The method of claim 1, wherein the first uplink control channel for a downlink-only carrier has a highest physical or logical index number associated with one or more logical resource units immediately after the one or more logical resource units allocated for the primary uplink control channel.

5. The method of claim 4, wherein the second uplink control channel for a second downlink-only carrier has a next highest physical or logical index number associated with one or more logical resource units immediately after the one or more logical resource units allocated for the first uplink control channel.

6. The method of claim 1, wherein the downlink-only carrier and the second downlink-only carrier both comprise unicast radio frequency carriers.

7. The method of claim 1, wherein the first uplink control channel and the second uplink control channel include one or more of: HARQ feedback channels, fast feedback channels, and bandwidth request channels.

8. A method, performed at a mobile station, the method comprising:
   requesting feedback to be provided in allocated uplink control channels for at least one primary uplink control channel;
   requesting feedback to be provided in an allocated first uplink control channel for a downlink-only carrier; and
   requesting feedback to be provided in an allocated second uplink control channel for a second downlink-only carrier, wherein the first uplink control channel for a downlink-only carrier is allocated in one or more logical resource units immediately following one or more logical resource units allocated for the primary uplink control channel and a logical resource unit for the first uplink control channel having an index number.

9. The method of claim 8, wherein the first uplink control channel for a downlink-only carrier has a lowest index number associated with one or more logical resource units allocated immediately after the one or more logical resource units allocated for the primary uplink control channel.

10. The method of claim 9, wherein the second uplink control channel for a downlink-only carrier has a next lowest index number associated with one or more logical resource units immediately after the one or more logical resource units allocated for the first uplink control channel.

11. The method of claim 8, wherein the first uplink control channel for a downlink-only carrier has a highest index number associated with one or more logical resource units allocated immediately after the one or more logical resource units allocated for the primary uplink control channel.

12. The method of claim 11, wherein the second uplink control channel for a downlink-only carrier has a next highest index number associated with one or more logical resource units immediately after the one or more logical resource units allocated for the first uplink control channel.

13. The method of claim 8, wherein the downlink-only carrier and the second downlink-only carrier both comprise unicast radio frequency carriers.

14. The method of claim 8, wherein the first uplink control channel and the second uplink control channel include one or more of: HARQ feedback channels, fast feedback channels, and bandwidth request channels.

15. A system comprising:
one or more antennae;
a display device;
a processor communicatively coupled to the display device and the one or more antennae, the processor configured to:
request feedback to be provided in allocated uplink control channels for at least one primary uplink control channel,
request feedback to be provided in an allocated first uplink control channel for a downlink-only carrier, and
request feedback to be provided in an allocated second uplink control channel for a second downlink-only carrier, wherein the first uplink control channel for a downlink-only carrier is allocated in one or more logical resource units immediately after one or more logical resource units allocated for the primary uplink control channel and a logical resource unit for the first uplink control channel has an associated index number.

16. The system of claim 15, wherein
the first uplink control channel for a downlink-only carrier has a lowest index number for one or more logical resource units allocated immediately after the one or more logical resource units allocated for the primary uplink control channel and
the second uplink control channel for a downlink-only carrier has a next lowest index number for one or more logical resource units immediately after the one or more logical resource units allocated for the first uplink control channel.

17. The system of claim 15, wherein
the first uplink control channel for a downlink-only carrier has a highest index number for one or more logical resource units allocated immediately after the one or more logical resource units allocated for the primary uplink control channel and
the second uplink control channel for a downlink-only carrier has a next highest index number for one or more logical resource units immediately after the one or more logical resource units allocated for the first uplink control channel.

18. The system of claim 15, wherein the downlink-only carrier and the second downlink-only carrier both comprise unicast radio frequency carriers.

19. The system of claim 15, wherein the first uplink control channel and the second uplink control channel include one or more of: HARQ feedback channels, fast feedback channels, and bandwidth request channels.

20. The system of claim 15, wherein the primary uplink carrier, downlink-only carrier, and second downlink-only carrier comprise Frequency Division Duplex (FDD) carriers.

21. The method of claim 1, wherein
the first uplink control channel is allocated using allocation provided for the at least one primary uplink control channel and
the second uplink control channel is allocated using allocation provided for the at least one primary uplink control channel.

22. The method of claim 1, wherein one or more uplink control regions corresponding to the downlink-only carrier are pre-allocated without negotiation between the base station and a mobile station.

23. The method of claim 8, wherein
the first uplink control channel is allocated using allocation provided for the at least one primary uplink control channel and
the second uplink control channel is allocated using allocation provided for the at least one primary uplink control channel.

24. The system of claim 15, wherein
the first uplink control channel is allocated using allocation provided for the at least one primary uplink control channel and
the second uplink control channel is allocated using allocation provided for the at least one primary uplink control channel.

* * * * *